US012542952B1

United States Patent
Mapes et al.

(10) Patent No.: US 12,542,952 B1
(45) Date of Patent: Feb. 3, 2026

(54) METHODS AND SYSTEMS FOR SYNCHRONIZING RENDERING OF VIDEO FRAMES DURING SCRUBBING

(71) Applicant: Adobe Inc., San Jose, CA (US)

(72) Inventors: Mark Mapes, San Jose, CA (US); Kriti Sharma, San Jose, CA (US); Douglas Smith, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/911,149

(22) Filed: Oct. 9, 2024

(51) Int. Cl.
H04N 21/472 (2011.01)
H04N 21/433 (2011.01)

(52) U.S. Cl.
CPC ..... H04N 21/47217 (2013.01); H04N 21/433 (2013.01)

(58) Field of Classification Search
None
See application file for complete search history.

(56) References Cited

U.S. PATENT DOCUMENTS

| | | | |
|---|---|---|---|
| 2012/0070129 A1* | 3/2012 | Lin | G06F 40/103 386/278 |
| 2021/0098026 A1* | 4/2021 | Bedi | G06V 10/462 |
| 2022/0334692 A1* | 10/2022 | Wachtfogel | G11B 27/10 |

* cited by examiner

*Primary Examiner* — Heather R Jones
(74) *Attorney, Agent, or Firm* — Polsinelli LLP

(57) ABSTRACT

A media player includes an improved render process that synchronizes seeking operations with frame rendering. A media player receives a first input selecting a first location of a media segment. The thread executes a call to a dynamic renderer to render a first frame corresponding to the first location. The thread initiates a thread block to prevent further calls to the dynamic renderer while rendering the first frame. The media player then receives a second input selecting a second location of the media segment before the dynamic renderer finishes rendering the first frame. When the dynamic renderer finishes rendering the first frame, the thread blocking terminates, and the media player discards the now stale rendered first frame. The thread then executes a call requesting rendering of a frame corresponding to the second, current location of the media segment.

20 Claims, 5 Drawing Sheets

METHODS AND SYSTEMS FOR SYNCHRONIZING RENDERING OF VIDEO FRAMES DURING SCRUBBING

TECHNICAL FIELD

This disclosure relates generally to media players, and more particularly to improved rendering during scrubbing operations of media players.

BACKGROUND

With improvements to modern mobile computing (e.g., smartphones, tablets, etc.) such as high-resolution cameras and processing resources, mobile devices are capable of capturing and processing high quality media (e.g., images, audio, video, etc.). Media editing systems then process the raw, captured media transforming the raw media into a polished media presentation. The editing systems can tailor the raw media to a particular creative goal. For instance, color correction can adjust the color of media segment to black and white to increase a dramatic effect or to one or more bright colors (e.g., colors with a high saturation and lightness, etc.) to invoke a particular emotion. The editing system can apply other editing processes (e.g., such as media selection, upscaling or downscaling resolutions, compression, audio processing, etc.) for a similar impact.

SUMMARY

A dynamic renderer of a media processing system renders media during editing and thereof after. The dynamic renderer also renders one or more frames of the media during seeking operations (e.g., receiving input selecting a new location of the media to present). A scrubbing thread of the media player manages the seeking operation to improve a rendering rate of the dynamic renderer and efficiency of the seeking operation. Upon receiving input selecting a first presentation location of the media, the scrubbing thread executes a first call to a thread of the dynamic renderer for a frame of the media corresponding to the first location of the media. The media player initiates a thread blocking that prevents subsequent calls to the dynamic renderer. If the media player receives input selecting a second presentation location of the media, the media player places the input selecting the second presentation location into a queue. When the dynamic renderer finishes rendering the frame corresponding to the first location, the scrubbing thread receives a ready signal. The scrubbing thread releases the thread blocking and processes the queue by execute a second call to the thread of the dynamic renderer for a frame of the media at second location. Since the scrubbing thread receives the input selecting the second presentation location of the media before the dynamic renderer completes the rendering of the frame corresponding to the first location of the media, the media player discards the frame corresponding to the first location of the media.

The methods, systems, and non-transitory computer-readable media and systems described herein include various media editing systems and operations as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
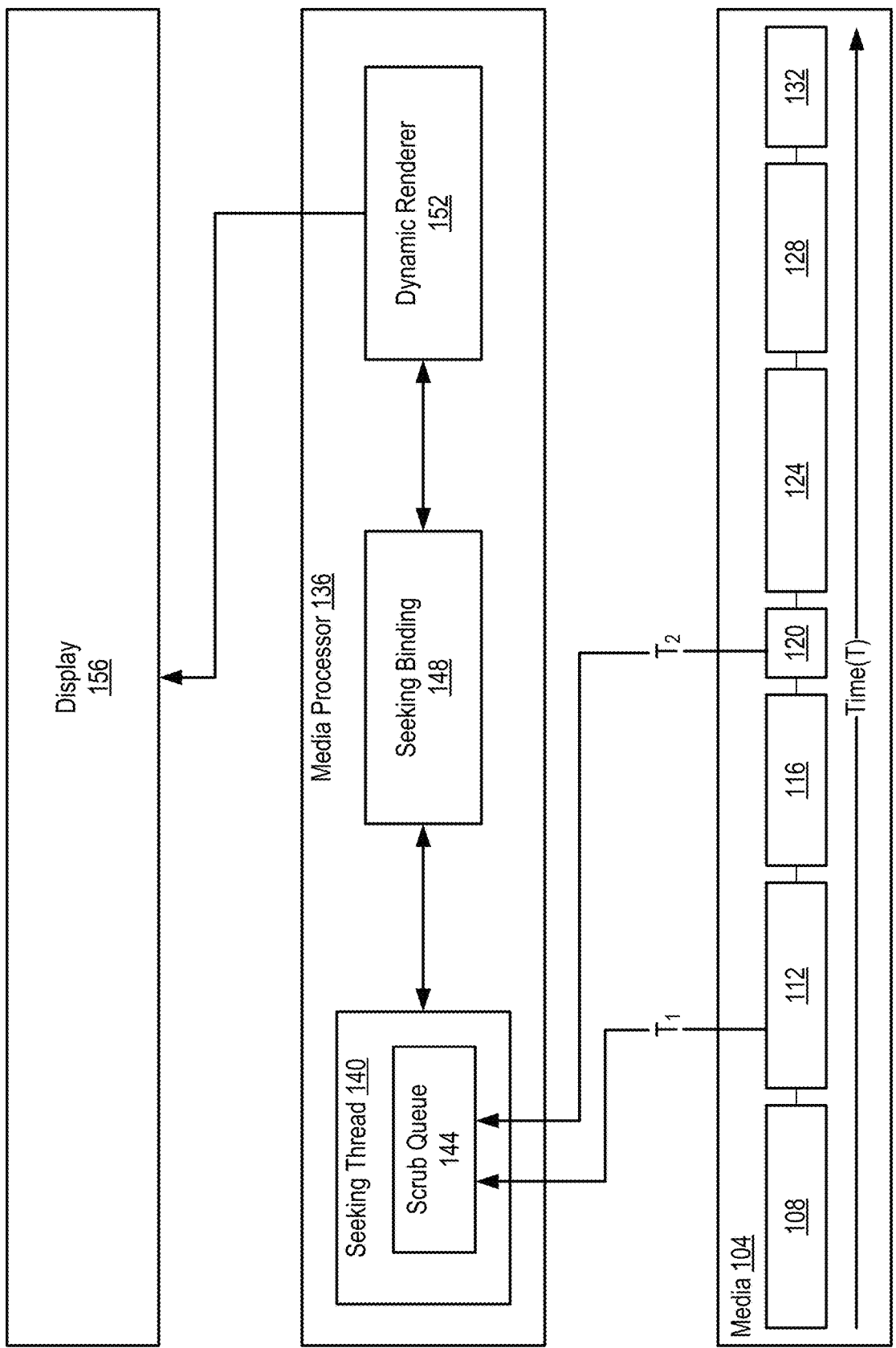
FIG. 1 illustrates a block diagram of an example media player of a media processing system with improve rendering during seeking and scrubbing according to aspects of the present disclosure.

Methods and systems are described herein for improved rendering during scrubbing operations of a media player. While there are conventional techniques for rendering individual frames of media while scrubbing the media, such conventional techniques are inefficient and consume excessive processing resources and time. When scrubbing occurs at a high rate such as when the scrubbing moves a new location of the media before the renderer finishes rendering a frame at the previous location, conventional techniques interrupt the renderer to stop rendering the frame at the previous location and start rendering a frame at the new location. The renderer takes time to terminate the previous rendering and dumping the portion of the rendered frame at the previous location. In some instances, the memory associated with rendering the frame at the previous location are tied up causing the renderer also allocates additional resources to rendering the frame at the new location. Thus, it is challenging to render individual frames of media at arbitrary locations of the media during scrubbing especially when the scrubbing occurs at a high rate causing additional rendering requests before subsequent requests have completed.

The methods and systems described herein include a scrubbing thread that executes scrubbing operations of the media device, manages subsequent scrub requests when the renderer is busy, and communicates with a thread of the renderer to synchronize rendering of frames with the scrubbing operation. For instance, a media player receives a request to present media. Upon loading the media (e.g., before or during presentation of the media), the media player receives a first input selecting a first location within the media. A scrubbing thread of the media player executes a call to a control thread of a dynamic renderer requesting rendering of a frame corresponding to the first location of the media. The scrubbing thread implements thread blocking that prevents subsequent calls to the dynamic renderer while the dynamic renderer renders the frame corresponding to the first location of the media. The scrubbing thread then waits while the dynamic renderer renders the frame corresponding to the first location of the media.

When the scrubbing thread receives a second input selecting a second location within the media, the scrubbing thread determines if there is a thread block that prevents the scrubbing thread from transmitting requests to the control thread (e.g., the scrubbing thread received the second input before the dynamic renderer completes the rendering of the frame corresponding to the first location of the media, etc.). In some examples, if there is a thread block, then the scrubbing thread discards the second input. In other examples, if there is a thread block, then the scrubbing thread queues a call to the control thread of the dynamic renderer requesting a frame corresponding to the second location of the media. The queue of the scrubbing thread holds a single call to the dynamic renderer. If the scrubbing thread receives subsequent request when there is a call in the queue and the control thread of the dynamic renderer is busy, then the scrubbing thread replaces the call stored in the queue with new call derived from the subsequent request. For instance, if the scrubbing thread receives input selecting a new location within the media after receiving the second input and before the dynamic renderer completes the rendering of the frame corresponding to the first location of the media, then the scrubbing thread removes the call to the control thread requesting the frame corresponding to the second location of the media and adds a call to the control thread request a frame corresponding to the new location of the media.

The dynamic renderer continues rendering the frame corresponding to the first location of the media. The dynamic renderer renders the frame in layers. For example, the frame includes a series of elements such as a background, foreground, characters, text, vectors, interface controls, effects, etc. that are layered to generate the frame. In some examples, the dynamic renderer rasterizes the frame (e.g., to convert vector-based frames, for example, into pixel data). The dynamic renderer renders each layer of the frame in a particular order such as background to foreground, foreground to background, or any other order. The dynamic renderer renders each layer according to the parameters of each layer. That is, the dynamic renderer applies the parameters for opacity, blending, etc. of each layer to that layer during rendering. In some instances, during scrubbing, the dynamic renderer renders a representation of the frame rather than the full frame. For instance, the dynamic renderer renders a thumbnail representation of the frame corresponding to the first location of the media. Alternatively, or additionally, the dynamic renderer renders a representation of the frame using fewer resources such as a lower resolution representation of the frame, a lower frame rate (for multi-frame implementations), combinations thereof, and/or the like.

Once the dynamic renderer completes rendering the frame corresponding to the first location of the media, the dynamic renderer stores the rendered in a framebuffer, or other temporary memory region for display. The control thread of the dynamic renderer passes a Ready signal to the scrubbing thread. In response to receiving the Ready signal, the scrubbing thread releases the thread block enabling the scrubbing thread to execute subsequent calls to the control thread. If the scrubbing thread received the second input selecting a second location within the media before the dynamic renderer finished rendering the frame corresponding to the first location, then the scrubbing thread processes the second input. In examples where the scrubbing thread implements a queue, the scrubbing thread removes the call to the control thread from the queue and executes the call to control thread to request rendering the frame corresponding to the second location of the media.

Since the scrubbing thread received the received the second input selecting a second location within the media before the dynamic renderer finished rendering the frame corresponding to the first location, the scrubbing thread disposes of the rendered frame corresponding to the first location. In some examples, disposing the rendered frame includes removing the rendered frame from the framebuffer (or other temporary memory location), deleting the rendered frame, storing the rendered frame in non-volatile memory or other volatile memory (e.g., in case of the scrubbing thread receives a future input corresponding to the first location again), and/or the like. In some examples, the media player does not present the frame corresponding to the first location to avoid presenting an old frame corresponding to an old location of the media. Instead, the scrubbing thread waits until the dynamic renderer completes rendering the frame corresponding to the second location of the media and facilitate presentation of the rendered frame corresponding to the second location of the media.

The methods and systems described herein address the aforementioned problems by instantiating a scrubbing thread that manages frame rendering by the dynamic renderer. The scrubbing thread implements thread blocking to prevent interruptions to the dynamic renderer, improving frame rendering, improving resource consumption by the dynamic renderer during high-rate scrubbing such as when the media player receives input selecting new location of the media before a rendered frame corresponding to the previous location completes, and improving the coordination of the scrubbing thread and the control thread, which better synchronizes the rendered frames with the corresponding scrubbing input.

FIG. 1 illustrates a block diagram of an example media player of a media processing system with improve rendering during seeking and scrubbing according to aspects of the present disclosure. A media processing system includes software, hardware, and/or a combination thereof for generating, editing, and presenting media. The media processing system includes a media player that renders and presents media. For instance, media 104 includes set of media segments 104. Each media segment includes an image, a video segment, an audio segment, combinations thereof, and/or the like. The media processing system represents the size of the media segments according to the amount of time the media segment presents relative to the presentation of the media as a whole. The media processing system includes controls to modifying the media by adding new media segments, rearranging media segments, executing one or more editing operations on media segments, modifying presentation characteristics (e.g., such as frame rates, size, resolution, sound filters or mixing, etc.), adjusting a presentation length of the media segments, selecting music or other audio segments for presentation during a media segment or the media as a whole, combinations thereof, and/or the like.

The media player of the media processing system supports rendering during seeking and scrubbing operations. A seeking operation refers to the selection of location of the media other than the location that is currently presenting. A scrubbing operation refers to multiple, sequential selections of locations of the media other than the location that is currently presenting. For instance, the media player receives input (e.g., from a touch interface, input device etc.) selecting and holding a first location of a progress bar of the media player. The media player first treats the input as a seek operation and begins rendering frames the media corresponding to the first location. If further input is received along the progress bar such as dragging the progress bar from a first location to a second location of the progress bar, the media player renders frames of the media corresponding to the second location. When the media player detects termination of the input (e.g., input device button release, finger is removed from the touch interface, etc.), the media player resumes playing the media at the location corresponding to the location of the progress bar where the input terminated.

For example, a seeking operation refers to the media player receiving input selecting $T_1$ of the progress bar corresponding to a location within media segment 112. The media player begins rendering frames of the media corresponding to $T_1$ and resumes presentation of the media, presenting from the location within media segment 112. In another example, a scrubbing operation refers to the media player receiving continuous input selecting $T_1$ of the progress bar and dragging the progress bar from $T_1$ to $T_2$.

A media processor 136 of the media player manages the rendering of media frames. Upon receiving input selecting a new location of the progress bar at $T_1$, seeking thread 140 of media processor 136 executes a call to dynamic renderer 152 to render a frame of the media corresponding to the location at $T_1$. For scrubbing operations (or any seeking operation where new locations are selected before dynamic renderer 152 finishes rendering a previous frame), in some examples, the media player attempts to render a frame corresponding to each location of the progress bar between $T_1$ and $T_2$ (e.g., such as each frame of the media between the two locations). In other examples, the media player attempts to render a frame corresponding to select locations of the progress bar between $T_1$ and $T_2$. For instance, during the input dragging the progress bar from $T_1$ and $T_2$, the input pauses at particular locations along the progress bar. The media player renders the frame corresponding to the particular locations along the progress bar in which input pauses for longer than a threshold time interval.

In still yet other examples, the media player renders as many frames as possible. Seeking thread 140 executes the call to dynamic renderer 152 to render a first frame of the media corresponding to the location at $T_1$. Media processor 136 uses seek binding 148 to bind seeking thread 140, which prevents seeking thread 140 from executing additional calls to dynamic renderer 152 while dynamic renderer 152 renders the first frame. For example, in some instances, when dynamic renderer 152 receives a new request to render a frame while rendering a previous frame, the new request causes an interrupt. Dynamic renderer 152 terminates rendering of the previous frames, allocates new resources, and begins rendering the frame of the new request. The interrupt consumes time and resources of media processor 136 reducing a rate in which dynamic renderer can render frames. Seek binding 148 prevents seeking thread 140 from executing calls that interrupt dynamic renderer 152.

Seeking thread 140 receives an identification of each location of the progress bar upon receiving continuous input dragging the progress bar from $T_1$ to $T_2$. If seeking thread 140 is bound by seek binding 148, then seeking thread 140 establishes queue 144 and pushes an identification of a frame corresponding to the next location from the continuous input onto queue 144. When dynamic renderer 152 finishes rendering the first frame, dynamic renderer 152 passes a ready signal to seek binding 148 and seek binding 148 unbinds seek thread 140. In some instances, media processor 136 stores the rendering of the first frame within a framebuffer or other temporary location for presentation by display 156. In other instances, since seeking thread 140 received an indication of the next location of progress bar before dynamic renderer 152 completed rendering the of the first frame, media processor 136 discards the rendering the first frame to prevent display of a frame that does not correspond to the current location selected by the input.

Seeking thread 140 then executes a call to dynamic renderer 152 based on the next location in queue 144. To avoid rendering frames corresponding to old locations of the progress bar (e.g., where the currently selected location of the progress bar is no longer the location in queue 144), queue 144 stores an identification of single frame (e.g., corresponding to a single location from the continuous input). If seeking thread 140 receives an identification of new input from the continuous input and 1) seeking thread is bound by seek binding 1458 (e.g., dynamic renderer 152 is busy), and 2) queue 144 includes is not empty (e.g., includes one location), then seeking thread 140 replaces the entry in queue 144 with an identification of a frame corresponding to the location of the progress bar associated with the new input.

In some alternative implementations, seeking thread 140 does not include queue 144. Instead, seeking thread 140 receive an identification of a location of the progress bar. If seeking thread 140 is bound by seek binding 148 (e.g., dynamic renderer 152 is busy rendering a frame), seeking thread 140 does not execute a call to dynamic renderer 152 to render a frame at the identified location of the progress bar. Instead, seeking thread 140 waits until seek binding 148 unbinds seeking thread 140. Seeking thread 140 executes call to dynamic renderer 152 to render a frame corresponding to the next location received after the unbinding.

By preventing interruptions to dynamic renderer 152, dynamic renderer 152 operates more efficiently both in terms of time and resource consumption. Preventing interruptions enables dynamic renderer 152 to render frames at a higher rate by avoiding the time cost of stopping operations, allocating and/or deallocating memory, and initiating a new rendering operation.

Dynamic renderer 152 includes one or more rendering configurations based on the type of call received from seeking thread 140. In some instances, dynamic renderer 152 renders complete frames (e.g., in a same representation as when rendering the media during ordinary playback). In other instances, such as during seeking operations or scrubbing operations, dynamic renderer 152 renders a reduced representation of the frame to increase the rendering rate. For example, the reduced representation is a thumbnail representation. In other examples, the reduced representation includes a lower resolution, fewer layers (e.g., just the first one or more layers of the frame, etc.), a smaller size, fewer colors, combinations thereof, and/or the like.

Figure 2:
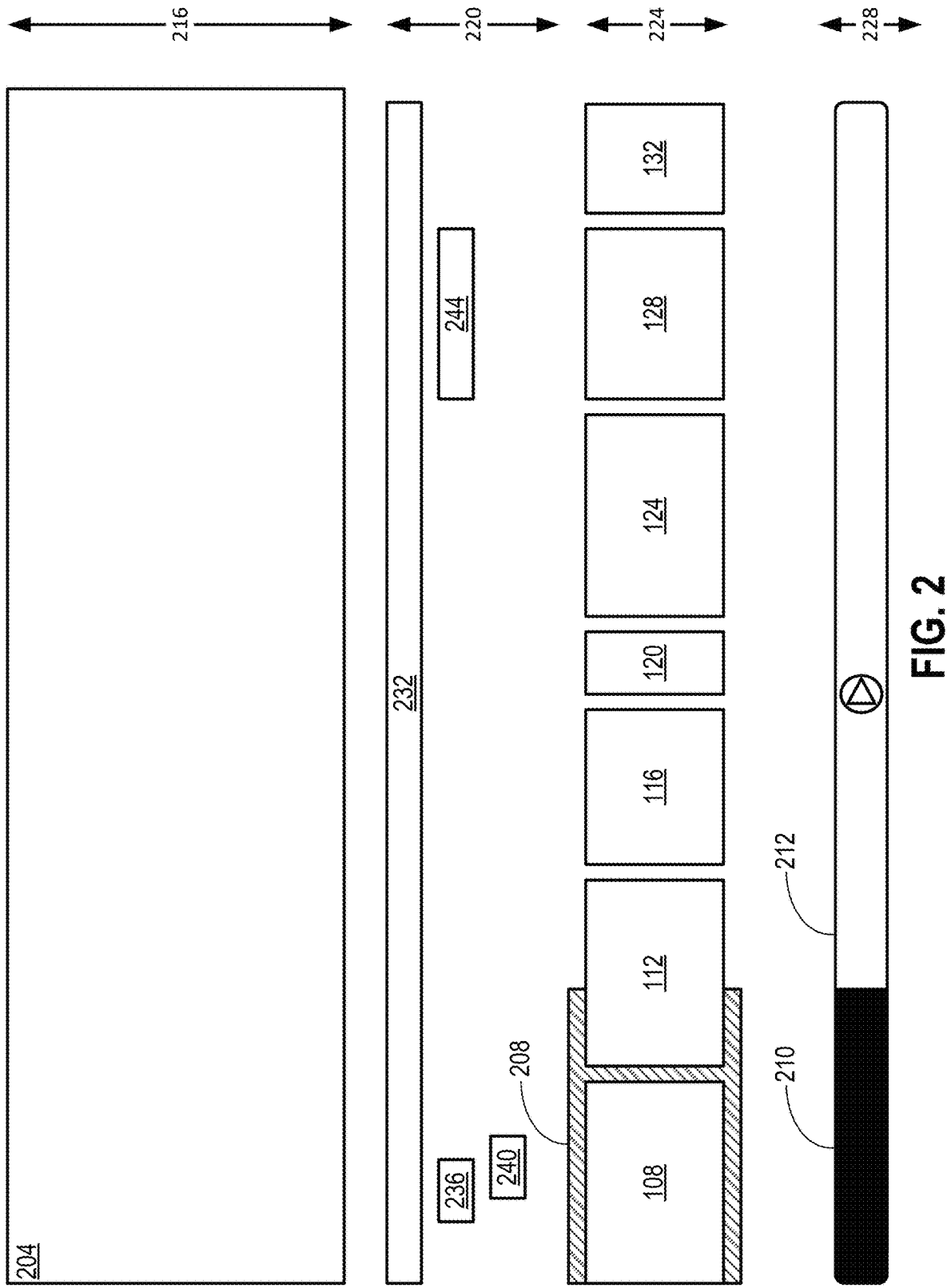
FIG. 2 illustrates a diagram of an example media editing system configured to generate, edit, and/or present media according to aspects of the present disclosure.

FIG. 2 illustrates a diagram of an example media editing system configured to generate, edit, and/or present media according to aspects of the present disclosure. The media editing system executes on a computing device or mobile device (e.g., smartphone, tablet, etc.) to enable generating new media and editing exiting media. The media editing system includes a control interface (e.g., a graphical user interface) that provides graphical representation of media and media segments, and controls configured to execute editing operations on the media and media segments. The media editing system generates new media by accessing media stored in memory of the computing device or mobile device. The media editing system receives a selection of one or more media segments from memory. The media editing system then receives input identifying a presentation order of the one or more media segments. On devices with touch interfaces, the user reorders the media segments touching an area of a touch interface over a media segment and dragging the media segment to a new location. Alternatively, the media editing system loads existing media comprising one or more media segments from memory. The media editing system represents the one or more media segments of the existing media in a presentation sequence. In some examples, the user provides input to reorder the one or more media segments of the existing media as previously described.

Control interface includes one or more regions with each region including controls to modify the media or particular media segments. For example, regions 216-228 each present information relating to the media. Region 216 includes display 204, which displays the media, media segments, and individual frames of media segments. Region 220 includes an element hierarchy representing elements layered onto the media. Region 224 includes a representation of the presentation sequence of media segments. Region 228 includes progress bar 212. Each region is expandable at the expense of one or more other regions of regions 216-228. For instance, selecting display 204 of region 216 causes region 216 to expand and one or more other regions to contract to make room for the expanded form of display 204. In some instances, region 224 and/or region 228 may not contract when another region is selected to enable navigating through the media and/or media segments. The control interface receives input defining the arrangement of regions 216-228. For instance, control interface receives user input selecting a particular region and dragging the region over another region of regions 216-228 causing the selected region to be placed proximate to the other region or switch places with the other region.

Region 216 of control interface includes a display 204 that displays a representation of media being loaded into the media editing system. Control interface includes controls for initiating a presentation (e.g., playback) of the media. Control interface includes a graphical representation of a current portion of the media being presented by display 204. For example, bar 208 provides a representation of a current location of the media that is selected or being presented. Bar 208 appears proximate to a sequence of icons representing media segments 108-132 and moves from left to right (in one example), around the icons representing media segments 108-132. The right-most edge of bar 208 (in this example) represents the current location of the media being presented. The icon of the media segment closest to the right-most edge of bar 208 corresponds to the media segment being presented. Segment 210 of progress bar 212 also provides an indication of the current location of the media being presented. Segment 210 also moves from left to right within progress bar 212 as the media is presented.

Control interface receives input selecting a location within progress bar 212 and adjusts the current portion of the media being presented as the portion of the media that corresponds to the selected location. For instance, control interface receives input selecting a particular portion of progress bar 212 and begins presenting the portion of the media represented by the particular portion of progress bar 212 within display 204. Alternatively, or additionally, control interface receives input dragging segment 210 to the right to advance the media or to the left to rewind the media. Similarly, control interface adjusts the current portion of the media being presented within display 204 through bar 208. For instance, control interface receives input selecting a particular media segment of media segments 108-132 and begins presenting the particular media segment. Alternatively, or additionally, control interface receives input selecting a particular portion of a media segment (e.g., such as a touch interface receiving touch input over a portion of an icon representing a media segment) and begins presented the particular portion of the media segment. Alternatively, or additionally, control interface receives input dragging bar 208 to the right to advance the media or to the left to rewind the media. In some examples, the control interface receives input selecting a particular media segment and dragging the particular media segment to a new location within the sequence of media segments of region 224 to reorder media segments 108-132. In some instance, the particular media segment moves to the selected location within the sequence of media segments 108-132. In other instances, the particular media replaces the media segment at the location within the sequence of media segments 108-132 of region 224.

Control interface includes a dynamic media renderer that presents a portion of the media during scrubbing while preventing the presentation from delaying further scrubbing. Scrubbing occurs when control interface receives input proximate to progress bar 212 a new location within progress bar 212. Dynamic media renderer renders frames of the media during scrubbing enabling a user to see one or more frames of the media when at a location within the progress bar. When control interface receives continuous input from a first location of progress bar 212 to a second location of progress bar 212, to a third location of progress bar 212, the control interface waits for dynamic media renderer to return a frame of the media corresponding to the second location of progress bar 212 when the input is received corresponding to the third location of progress bar 212. In some instances, the control interface interrupts the dynamic media renderer before dynamic media renderer can finish rendering the frame for the second location of progress bar 212 and executes a new request for a frame at the third location of progress bar 212. Implementing the interrupt takes time and uses processing resources of the media editing system to execute commands to pause execution of the dynamic media renderer identify and prepare the dynamic media renderer for execution of a new rendering process. The time used to implement the interrupt is longer than the time to wait for the dynamic media renderer to finish rendering the frame of the media corresponding to the second location of progress bar 212. When scrubbing through multiple locations of progress bar 212, the control interface waits to obtain the frame from the dynamic media renderer even when a new location of progress bar 212 has already been selected. The control interface does not show the fame because the control interface already received a new location of progress bar 212. In some examples, the control interface discards the frame. In other instances, the control interface stores the frame in memory (e.g., cache memory, random access memory, and/or non-volatile memory, etc.) for future use.

For example, the input is a selection and hold (e.g., such as a finger press on a touch interface, followed by a drag along the touch interface from a first location to a second location) or a touch. If the input is a touch and hold, the control interface executes a call to dynamic media renderer when the input causes segment 210 to be positioned over a different portion of progress bar 212. Dynamic media renderer then executes one or more rendering operations to render a frame of the media at the different portion of progress bar 212. The dynamic media renderer then returns a representation of the frame for presentation within display 204 or as a thumbnail just above progress bar 212. If the input is continuous (e.g., the finger is dragged to a new location of progress bar 212 without disconnecting from the touch interface) and shifts to a new location of progress bar 212 before dynamic media renderer returns with the frame, then control interface waits for the frame from dynamic media renderer, delete the frame, and execute a new call to dynamic media renderer for a new frame of the media corresponding to the new location of progress bar 212. The control interface does not interrupt the dynamic media renderer when the input continues to a new location of progress bar 212, but instead waits for dynamic media renderer to complete the operation before executing a new command. By waiting for dynamic media renderer to complete the operation and discarding the output, the control interface access frames of the media during scrubbing much faster than if the dynamic media renderer is terminated. When control interface detects that the input is terminated (e.g., the finger is disconnected from the touch interface, etc.) the dynamic media renderer begins rendering the media at the location of the media corresponding to the location of the progress bar in which the input terminated.

Control interface includes a control over display 204 or proximate to display 204 that when selected provides a list of editing operations. The list of editing operations includes a graphical layer that enables adding one or more graphical elements over a portion of the media segment. In some examples, the control interface presents the graphical element over the entire presentation length of the media segment, over a particular time interval of the presentation length, or over the entire presentation length of the media. The control interface places the graphical element onto the image by receiving input dragging the graphical element from the list to a location over display 204. In some examples, the control interface resizes or rotates the graphical element based on a single touch gesture. For instance, the user selects an edit location positioned on or proximate to the graphical element using a finger on a touch interface. The user then moves the finger away from the graphical element to increase a size of the graphical element or moves the finger towards the edit location to decrease the size of the graphical element. While resizing the graphical element, the user moves the finger 360 degrees around the edit point causing the graphical element to rotate accordingly. When the finger disconnects from the surface of the touch interface, the resizing and rotation is saved. The control interface enables just resizing the graphical element, just rotating the graphical element, or rotating and resizing the graphical element in a single gesture.

Region 220 of the control interface includes an element hierarchy providing a graphical representation of elements and/or effects added to the media or modifications to the media. For instance, when elements (e.g., graphical elements, animations, audio segments, etc.) are added to the media, control interface expands region 220, the space between display 204 and progress bar 212. Region 220 presents a representation of elements added to the media such as elements 232-244. The control interface positions the representation of the elements relative to the icons of media segments 108-132 to indicate the position of the elements within the media. For instance, musical element 232 extends over the length of progress bar 212 indicating the element is presented is presented over the entire presentation length of the media. The representation of graphical element 236 is presented over a portion of media segment 108 indicating that graphical element 236 is presented during that portion of media segment 108. The representation of graphical element 244 overlaps the representation of graphical element 236 indicating graphical element 244 is presented at the same time as graphical element 236 for at least a portion of the presentation length of media segment 108.

The control interface presents elements of region 220 in a particular orientation or color based on the element type. For instance, the control interface presents elements representing audio segments such as music, etc. above elements representing graphics. The control interface presents elements representing graphics above elements representing effects. The control interface presents elements representing effects above elements representing modifications to the media or media segments. Alternatively, control interface presents elements in the opposite order with elements representing audio segments presented below elements representing graphics, etc. In addition, the control interface accepts input to rearrange the order of element types. In some examples, the control interface presents each element type using a particular color and/or texture.

Control interface includes controls that modify editing operations applied to the media segments 108-132. For instance, some editing operations impact some media segments differently than other media segments based on features of the media segments such as presentation length. A zoom effect applied to an image media segment, for instance, zooms into the image media segment from an initial representation of the image media segment to a final zoomed-in representation of the image. The rate of the zoom effect is based on the presentation length of the media segment causing some media segments, such as media segment 120 and media segment 132 to zoom at a higher rate than other media segments such as media segment 124 and media segment 112 due to the differences in presentation length between media segment 120 and media segment 124. The disparate impact of the editing operations affects the presentation of the overall media. Control interface includes controls that scale the editing operations as applied to particular media segments relative to other media segments and/or the media as a whole to normalize the appearance of the media segments during presentation of the overall media.

In some examples, control interface includes a representation of modifications to media segments as an element within region 220 and a representation of modifications to editing operations that modify media segments. For instance, control interface adds an editing operation element to the elements presented in region 220. The control interface represents the editing operation element using a particular color or texture that corresponds to editing operations. In some instances, if an editing operation is modified for a particular media segment, the control interface modifies the appearance of that editing operation element within region 220 so that the modified editing operation is easy to distinguish from non-modified editing operations. In some examples, the control interface modifies the appearance based on the degree of modification to the editing operation. For instance, an editing operation element representing a modification to a zoom effect applied to media segment 120 uses a different color and/or texture, a brighter color and/or texture, a darker color and/or texture, etc. than the representation of an editing operation element representing a modification to a zoom effect applied to media segment 128. Any color and/or texture may be used for an element to represent an editing operation, and any color and/or texture may be used to indicate a modification to an editing operation.

Figure 3:
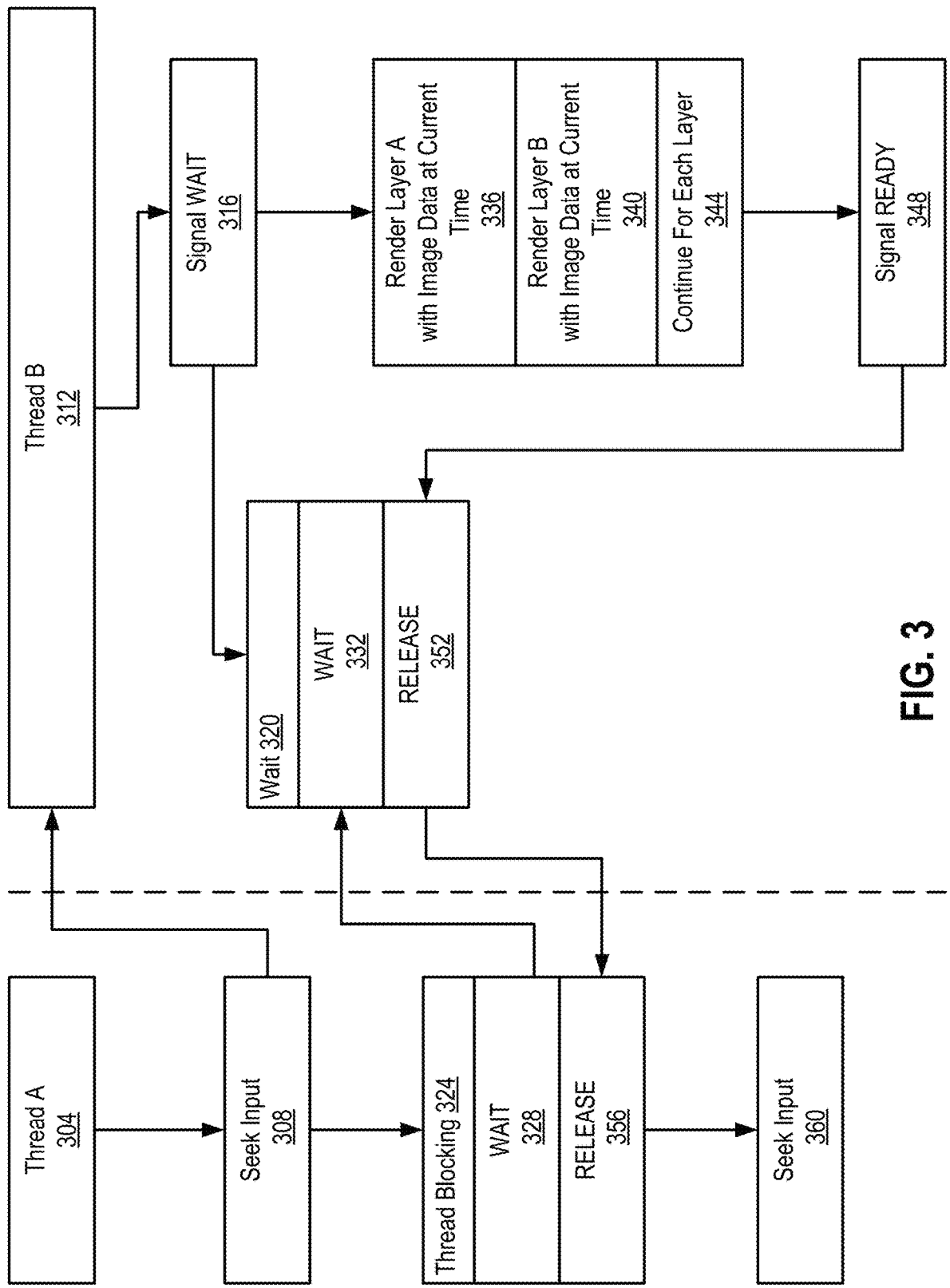
FIG. 3 illustrates a block diagram of an example process for rendering frames during seeking or scrubbing of media according to aspects of the present disclosure.

FIG. 3 illustrates a block diagram of an example process for rendering frames during seeking or scrubbing of media according to aspects of the present disclosure. A media processor of a media player executes operations of the media player including rendering of media frames during seeking and/or scrubbing operations. Upon loading the media player (and/or particular media within the media player), the media player instantiates thread A 304 to synchronize the rendering of frames of the media with seeking and/or scrubbing operations. At block 308, thread A receives input selecting a first location of the media (e.g., a seek and/or scrubbing operation). Thread A 304 executes a call to thread B 312 of a dynamic renderer requesting rendering of a frame of the media corresponding to the first location of the media. Thread A 304 also instantiates thread blocking 324 that binds thread A 304 preventing thread A from executing subsequent requests to thread B to render frames. Thread blocking 324 includes a wait operation 328 and a release operation 356.

Thread B 312 issues Signal Wait 316 that establishes wait 320, a sub-process of thread B. Wait 320 synchronizes a status of thread B 312 with thread blocking 324 of thread A 304. For example, thread A 304 links wait operation 328 with wait operation 332 of wait 320 of thread B 312 and release operation 356 with release 252 of thread B 312. Thread B 312 continues rendering the frame corresponding to the first location by rendering the layers of the frame. Thread B 312 renders frames in layer order beginning with layer A using image data at the current time 336, layer B using image data at the current time 340, and so on for each layer 344. Once thread B 312 finishes rendering each layer of the frame, thread B 312 issues Signal Ready 348 to wait 320. Wait 320 initiates release 352, which causes release operation 356 of thread blocking 324 to terminate thread blocking 324.

Thread blocking 324 prevents thread A 304 from executing additional calls to thread B 312 while thread B renders the frame. In some examples, if thread A 304 receives new input selecting a second location of the media while thread blocking 324 is in place, then the new input is discarded. In other examples, thread A 304 includes a queue that stores one or more inputs for new locations of the media. Thread A stores the input selecting the second location of the media in the queue until thread blocking 324 is released. The queue stores a limited number of entries to prevent rendering old frames after receiving input corresponding to new locations of the media.

Thread A 304 receives new seek input 360 identifying a second location of the media. Thread A 304 determines that thread blocking 324 is not in place and executes a call to thread B 312 to render a frame of the media corresponding to the second location identified in seek input 360. Thread A 304 also initiates a new thread blocking (not shown) to prevent further calls to thread B 312 while thread B 312 renders frame of the media corresponding to the second location. The process continues until the media player unloads the media and/or until the media player terminates.

Figure 4:
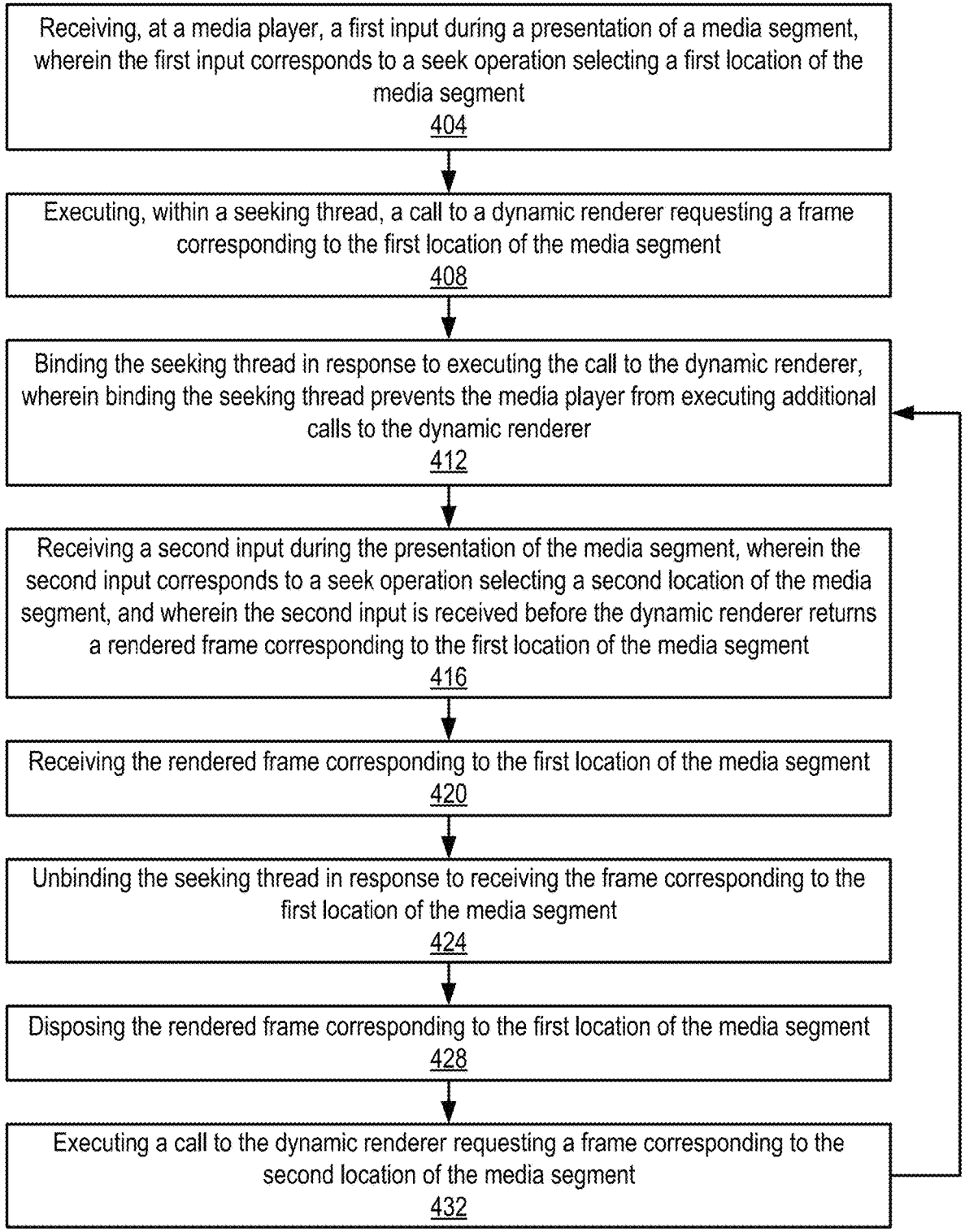
FIG. 4 illustrates a flowchart of an example process for rendering during seeking and scrubbing operations of a media player according to aspects of the present disclosure.

FIG. 4 illustrates a flowchart of an example process for rendering during seeking and scrubbing operations of a media player according to aspects of the present disclosure. A computing device executes a media player to present a media segment. The media player loads the media segment from local memory, remote memory, a streaming location, and/or the like. At block 404, the media player receives a first input during a presentation of the media segment. The first input corresponds to a seek operation selecting a first location of the media segment. The media player includes a control interface that exposes accessible controls of the media player. The control interface includes a progress bar or other visual interface element that indicates a location of the media being presented. In some examples, the first input corresponds to a singular input from a touch interface or input device such as an input proximate to a location of the progress bar representing the first location. In other examples, the first input corresponds to a continuous input from the touch interface or input device such as a selecting and dragging of the progress bar from an initial location (corresponding to the first location) to another location.

At block 408, a seeking thread of the media player executes a call to a dynamic renderer requesting a frame corresponding to the first location of the media segment. The dynamic renderer includes a control thread that manages rendering of the media segment and interacting with the seeking thread.

At block 412, the media player binds the seeking thread in response to executing the call to the dynamic renderer. Binding the seeking thread prevents the media player from executing additional calls to the dynamic renderer that interrupt the dynamic renderer, such as when the media player receives new input associated with the progress bar. In some examples, binding the seeking thread includes initiating a thread block within the seeking thread that is synchronized with a portion of a thread of the dynamic renderer. The thread block prevents the seeking thread from executing further commands, function calls, etc. until the thread of the dynamic renderer releases the thread block.

At block 416, the media player receives a second input during the presentation of the media segment. The second input corresponds to a seek operation selecting a second location of the media segment. In some examples, the second input is related to the first input. For instance, the first input includes a selection and dragging of the progress bar between an initial location representing the first location of the media segment and a final location representing the second location of the media segment (e.g., where a finger of the user disconnects from the touch interface, the user releases the input device, etc.). Alternatively, the first input includes a selection and dragging of the progress bar between the initial location representing the first location of the media segment and an intermediate location between the initial location and the final location. In other examples, the second input is unrelated to the first input.

In some instances, the media player receives the second input before the dynamic renderer returns a rendered frame corresponding to the first location of the media segment. The media player includes a single queue that stores one or more inputs corresponding to locations of the media segment. The media player stores the second request in the queue until the dynamic render completes rendering of the frame corresponding to the first location of the media segment. Since the media player limits the size of the single queue, if the media player receives a third input selecting a third location before the dynamic renderer returns a rendered frame corresponding to the first location, then the media player removes the second input from the single queue and stores the third input in the single queue. By replacing the input stored in the single queue with the most recently received input, the media player facilitates rendering of the frames that are closest to the current location of the progress bar.

In other instances, the media player prevents processing of input related to changes in location along the progress bar while the dynamic renderer renders frames (e.g., due to the binding of the seeking thread).

At block 420, the media player receives a rendered frame corresponding to the first location from the dynamic renderer.

At block 424, the media player unbinds the seeking thread in response to receiving the rendered frame corresponding to the first location of the media segment. In some examples, the dynamic renderer passes a ready signal to seeking thread indicating the dynamic renderer finished generating the rendered frame corresponding to the first location. The ready signal causes the seeking thread to terminate the thread blocking allowing the seeking thread to execute additional calls to the dynamic renderer. In other examples, the seeking thread At block 428, the media player disposes of the rendered frame corresponding to the first location of the media segment by deleting the rendered thread, storing the rendered thread in temporary memory such as a framebuffer or in volatile or non-volatile memory, presenting the rendered thread, etc. For instance, since the media player received the second input before the dynamic renderer finished rendering the frame corresponding to the first location, the location of the touch interface or input device is no longer at a location of the progress bar corresponding to the first location. In other words, the rendered frame corresponding to the first location no longer represents the currently selected location of the media segment. However, interrupting the dynamic renderer during rendering impacts the efficiency of the dynamic renderer wasting both time and processing resources. Instead, the media player disposes of the rendered frame corresponding to the first location to prioritize processing of the second input.

At block 432, the seeking thread of the media player executes a call to the dynamic renderer requesting a frame corresponding to the second location of the media segment. The process then returns to block 412 where the media player binds the seeking thread while the dynamic renderer renders the frame corresponding to the second location of the media segment.

Once the dynamic renderer generates a rendered frame corresponding to the second location of the media segment, the media player presents the rendered frame corresponding to the second location of the media segment. Alternatively, if the media player receives a third input selecting a third location of the media segment during rendering of the frame corresponding to the second location, the media player disposes the rendered frame corresponding to the second location of the media segment.

The process of FIG. 4 continue until the media player receives no further input selecting locations of the media segment, until the media player terminates presentation of the media segment, and/or until the media player terminates. The blocks of FIG. 4 can be executed in any order. For instance, in some implementations, the media player discards (or ignores) inputs selecting new locations of the media segment while the seeking thread is bound (e.g., while the dynamic renderer is busy rendering a frame) such as the second input at block 416. Instead, the media player receives such inputs (e.g., the second input of block 416) after block 420 when the seeking thread is no longer bound.

Figure 5:
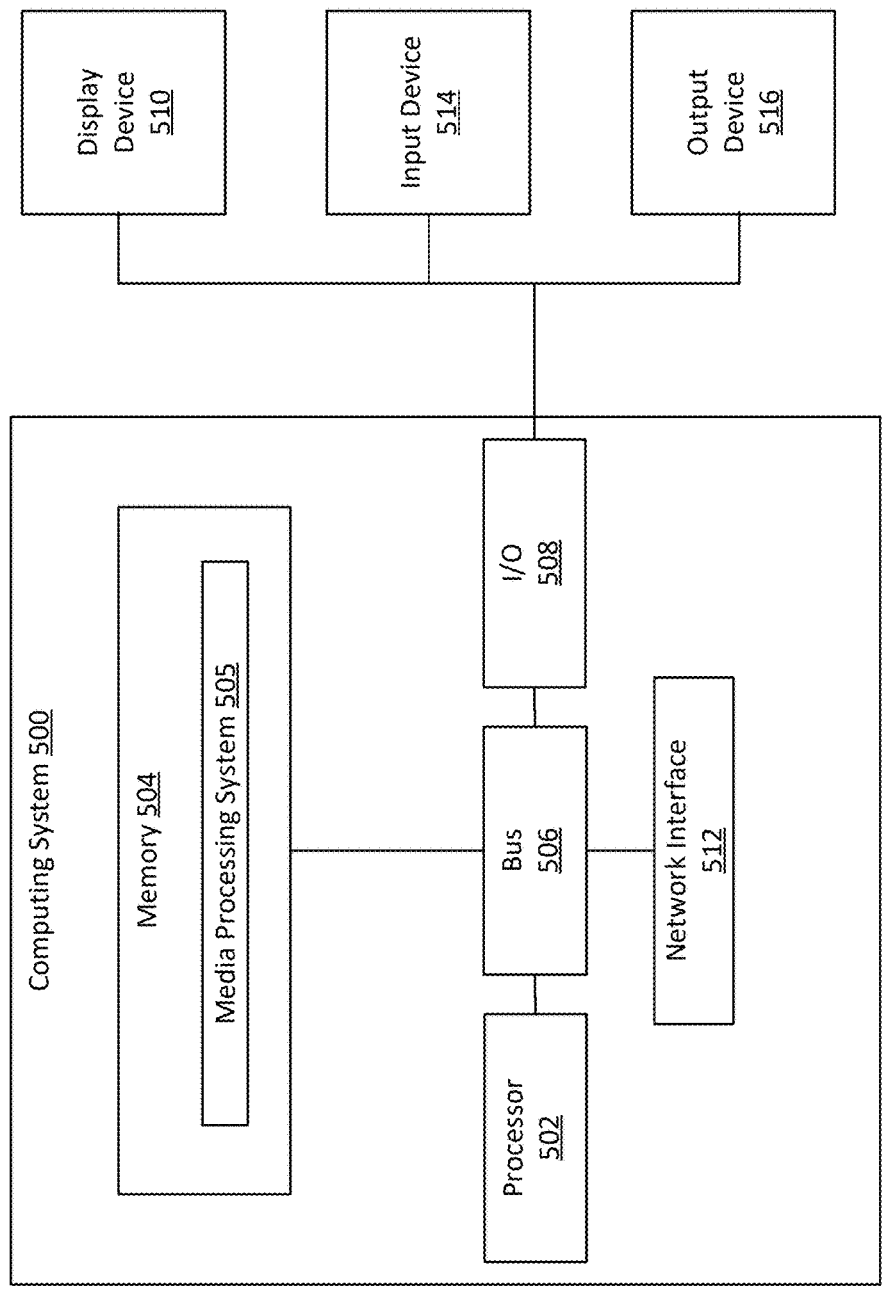
FIG. 5 illustrates an example computing device architecture of an example computing device that can implement the various techniques described herein according to aspects of the present disclosure.

Any suitable computing system or group of computing systems can be used for performing the operations described herein. For example, FIG. 5 depicts a computing system 500 that can implement any of the computing systems or environments discussed above. In some embodiments, the computing system 500 includes a processing device 502 that executes the media processing system, a memory that stores various data computed or used by the media processing system, an input device 514 (e.g., a mouse, a stylus, a touchpad, a touch-screen, etc.), and an output device 516 that presents output to a user (e.g., a display device that displays graphical content generated by media processing system). For illustrative purposes, FIG. 5 depicts a single computing system on which the media processing system is executed, and the input device 514 and output device 516 are present. But these applications, datasets, and devices can be stored or included across different computing systems having devices similar to the devices depicted in FIG. 5.

The example of FIG. 5 includes a processing device 502 communicatively coupled to one or more memory devices 504. The processing device 502 executes computer-executable program code stored in a memory device 504, accesses information stored in the memory device 504, or both. Examples of the processing device 502 include a microprocessor, an application-specific integrated circuit ("ASIC"), a field-programmable gate array ("FPGA"), or any other suitable processing device. The processing device 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 500 could also include a number of external or internal devices, such as a display device 510, or other input or output devices. For example, the computing system 500 is shown with one or more input/output ("I/O") interfaces 508. An I/O interface 508 can receive input from input devices or provide output to output devices. One or more buses 506 are also included in the computing system 500. Each bus 506 communicatively couples one or more components of the computing system 500 to each other or to an external component.

The computing system 500 executes program code that configures the processing device 502 to perform one or more of the operations described herein. The program code includes, for example, code implementing the document-processing application 102 or other suitable applications that perform one or more operations described herein. The program code can be resident in the memory device 504 or any suitable computer-readable medium and can be executed by the processing device 502 or any other suitable processor. In some embodiments, all modules in the media processing system are stored in the memory device 504, as depicted in FIG. 5. In additional or alternative embodiments, one or more of these modules from the media processing system are stored in different memory devices of different computing systems.

In some embodiments, the computing system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computing system 500 is able to communicate with one or more other computing devices (e.g., a computing device that receives inputs for document-processing application 102 or displays outputs of the document-processing application 102) via a data network using the network interface device 512.

An input device 514 can include any device or group of devices suitable for receiving visual, auditory, or other suitable input that controls or affects the operations of the processing device 502. Non-limiting examples of the input device 514 include a touchscreen, stylus, a mouse, a keyboard, a microphone, a separate mobile computing device, etc. An output device 516 can include any device or group of devices suitable for providing visual, auditory, or other suitable sensory output. Non-limiting examples of the output device 516 include a touchscreen, a monitor, a separate mobile computing device, etc.

Although FIG. 5 depicts the input device 514 and the output device 516 as being local to the computing device that executes the document-processing application 102, other implementations are possible. For instance, in some embodiments, one or more of the input devices 514 and the output device 516 include a remote client-computing device that communicates with the computing system 500 via the network interface device 512 using one or more data networks described herein.

The following examples illustrate various aspects of the present disclosure. As used below, any reference to a series of examples is to be understood as a reference to each of those examples disjunctively (e.g., "Examples 1-4" is to be understood as "Examples 1, 2, 4, or 4").

Example 1 is a method comprising: receiving, at a media player, a first input during a presentation of a media segment, wherein the first input corresponds to a seek operation selecting a first location of the media segment; executing, within a seeking thread, a call to a dynamic renderer requesting a frame corresponding to the first location of the media segment; binding the seeking thread in response to executing the call to the dynamic renderer, wherein binding the seeking thread prevents the media player from executing additional calls to the dynamic renderer; receiving a second input during the presentation of the media segment, wherein the second input corresponds to a seek operation selecting a second location of the media segment, and wherein the second input is received before the dynamic renderer returns a rendered frame corresponding to the first location of the media segment; receiving the rendered frame corresponding to the first location of the media segment; unbinding the seeking thread in response to receiving the frame corresponding to the first location of the media segment; disposing the rendered frame corresponding to the first location of the media segment; and executing a call to the dynamic renderer requesting a frame corresponding to the second location of the media segment.

Example 2 is the method of example(s) 1, wherein unbinding the seeking thread includes: passing a ready signal to a sub-process of the dynamic renderer synchronized to the seeking thread, wherein the sub-process of the dynamic renderer releases the seeking thread.

Example 3 is the method of example(s) 1, wherein disposing the rendered frame of the media segment corresponding to the first location includes deleting the rendered frame.

Example 4 is the method of example(s) 1, wherein disposing the rendered frame of the media segment corresponding to the first location includes storing the rendered frame in memory.

Example 5 is the method of example(s) 1, further comprising: receiving the rendered frame of the media segment corresponding to the second location of the media segment; and presenting the rendered frame of the media segment corresponding to the second location of the media segment.

Example 6 is the method of example(s) 1, wherein the rendered frame corresponding to the first location of the media segment is a thumbnail.

Example 7 is the method of example(s) 1, wherein the call to the dynamic renderer requesting the frame corresponding to the second location of the media segment is queued until the seeking thread is unbound.

Example 8 is a system comprising: one or more processors; and a non-transitory computer-readable medium storing instructions that when executed by the one or more processors, cause the one or more processors to perform operations including: receiving, at a media player, a first input during a presentation of a media segment, wherein the first input corresponds to a seek operation selecting a first location of the media segment; executing, within a seeking thread, a call to a dynamic renderer requesting a frame corresponding to the first location of the media segment; binding the seeking thread in response to executing the call to the dynamic renderer, wherein binding the seeking thread prevents the media player from executing additional calls to the dynamic renderer; receiving a rendered frame corresponding to the first location of the media segment; unbinding the seeking thread in response to receiving the frame corresponding to the first location of the media segment; receiving a second input during the presentation of the media segment, wherein the second input corresponds to a seek operation selecting a second location of the media segment; executing a call to the dynamic renderer requesting a frame corresponding to the second location of the media segment.

Example 9 is the system of example(s) 8, wherein unbinding the seeking thread includes: passing a ready signal to a sub-process of the dynamic renderer synchronized to the seeking thread, wherein the sub-process of the dynamic renderer releases the seeking thread.

Example 10 is the system of example(s) 8, wherein the media player deletes the rendered frame of the media segment corresponding to the first location.

Example 11 is the system of example(s) 8, wherein the media player stores the rendered frame of the media segment corresponding to the first location within a frame buffer.

Example 12 is the system of example(s) 8, further comprising: receiving the rendered frame of the media segment corresponding to the second location of the media segment; and presenting the rendered frame of the media segment corresponding to the second location of the media segment.

Example 13 is the system of example(s) 8, wherein the rendered frame corresponding to the first location of the media segment is a thumbnail.

Example 14 is the system of example(s) 8, wherein the call to the dynamic renderer requesting the frame corresponding to the second location of the media segment is queued until the seeking thread is unbound.

Example 15 is a non-transitory computer-readable medium storing instructions that when executed by one or more processors, cause the one or more processors to perform operations including: receiving, at a media player, a first input during a presentation of a media segment, wherein the first input corresponds to a seek operation selecting a first location of the media segment; executing, within a seeking thread, a call to a dynamic renderer requesting a frame corresponding to the first location of the media segment; binding the seeking thread in response to executing the call to the dynamic renderer, wherein binding the seeking thread prevents the media player from executing additional calls to the dynamic renderer; receiving a second input during the presentation of the media segment, wherein the second input corresponds to a seek operation selecting a second location of the media segment, wherein the second input is received before the dynamic renderer returns a rendered frame corresponding to the first location of the media segment; storing a representation of the second input into a single queue, wherein the single queue is a temporary storage location that stores one input at a time; receiving the rendered frame corresponding to the first location of the media segment; unbinding the seeking thread in response to receiving the frame corresponding to the first location of the media segment; disposing the rendered frame corresponding to the first location of the media segment; and executing a call to the dynamic renderer requesting a frame corresponding to the second location of the media segment.

Example 16 is the non-transitory computer-readable medium of example(s) 15, wherein unbinding the seeking thread includes: passing a ready signal to a sub-process of the dynamic renderer synchronized to the seeking thread, wherein the sub-process of the dynamic renderer releases the seeking thread.

Example 17 is the non-transitory computer-readable medium of example(s) 15, wherein disposing the rendered frame of the media segment corresponding to the first location includes deleting the rendered frame.

Example 18 is the non-transitory computer-readable medium of example(s) 15, wherein disposing the rendered frame of the media segment corresponding to the first location includes storing the rendered frame in memory.

Example 19 is the non-transitory computer-readable medium of example(s) 15, further comprising: receiving the rendered frame of the media segment corresponding to the second location of the media segment; and presenting the rendered frame of the media segment corresponding to the second location of the media segment.

Example 20 is the non-transitory computer-readable medium of example(s) 15, wherein the rendered frame corresponding to the first location of the media segment is a thumbnail.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
receiving, at a media player, a first input during a presentation of a media segment, wherein the first input corresponds to a seek operation selecting a first location of the media segment;
executing, within a seeking thread, a call to a dynamic renderer requesting a frame corresponding to the first location of the media segment;
binding the seeking thread in response to executing the call to the dynamic renderer, wherein binding the seeking thread prevents the media player from executing additional calls to the dynamic renderer;
receiving a second input during the presentation of the media segment, wherein the second input corresponds to a seek operation selecting a second location of the media segment, and wherein the second input is received before the dynamic renderer returns a rendered frame corresponding to the first location of the media segment;
receiving the rendered frame corresponding to the first location of the media segment;
unbinding the seeking thread in response to receiving the frame corresponding to the first location of the media segment;
disposing the rendered frame corresponding to the first location of the media segment; and
executing a call to the dynamic renderer requesting a frame corresponding to the second location of the media segment.

2. The method of claim 1, wherein unbinding the seeking thread includes: passing a ready signal to a sub-process of the dynamic renderer synchronized to the seeking thread, wherein the sub-process of the dynamic renderer releases the seeking thread.

3. The method of claim 1, wherein disposing the rendered frame of the media segment corresponding to the first location includes deleting the rendered frame.

4. The method of claim 1, wherein disposing the rendered frame of the media segment corresponding to the first location includes storing the rendered frame in memory.

5. The method of claim 1, further comprising:
receiving the rendered frame of the media segment corresponding to the second location of the media segment; and
presenting the rendered frame of the media segment corresponding to the second location of the media segment.

6. The method of claim 1, wherein the rendered frame corresponding to the first location of the media segment is a thumbnail.

7. The method of claim 1, wherein the call to the dynamic renderer requesting the frame corresponding to the second location of the media segment is queued until the seeking thread is unbound.

8. A system comprising:
one or more processors; and
a non-transitory computer-readable medium storing instructions that when executed by the one or more processors, cause the one or more processors to perform operations including:
receiving, at a media player, a first input during a presentation of a media segment, wherein the first input corresponds to a seek operation selecting a first location of the media segment;
executing, within a seeking thread, a call to a dynamic renderer requesting a frame corresponding to the first location of the media segment;
binding the seeking thread in response to executing the call to the dynamic renderer, wherein binding the seeking thread prevents the media player from executing additional calls to the dynamic renderer;
receiving a rendered frame corresponding to the first location of the media segment;
unbinding the seeking thread in response to receiving the frame corresponding to the first location of the media segment;
receiving a second input during the presentation of the media segment, wherein the second input corresponds to a seek operation selecting a second location of the media segment;
executing a call to the dynamic renderer requesting a frame corresponding to the second location of the media segment.

9. The system of claim 8, wherein unbinding the seeking thread includes: passing a ready signal to a sub-process of the dynamic renderer synchronized to the seeking thread, wherein the sub-process of the dynamic renderer releases the seeking thread.

10. The system of claim 8, wherein the media player deletes the rendered frame of the media segment corresponding to the first location.

11. The system of claim 8, wherein the media player stores the rendered frame of the media segment corresponding to the first location within a frame buffer.

12. The system of claim 8, further comprising:
receiving the rendered frame of the media segment corresponding to the second location of the media segment; and
presenting the rendered frame of the media segment corresponding to the second location of the media segment.

13. The system of claim 8, wherein the rendered frame corresponding to the first location of the media segment is a thumbnail.

14. The system of claim 8, wherein the call to the dynamic renderer requesting the frame corresponding to the second location of the media segment is queued until the seeking thread is unbound.

15. A non-transitory computer-readable medium storing instructions that when executed by one or more processors, cause the one or more processors to perform operations including:
receiving, at a media player, a first input during a presentation of a media segment, wherein the first input corresponds to a seek operation selecting a first location of the media segment;
executing, within a seeking thread, a call to a dynamic renderer requesting a frame corresponding to the first location of the media segment;
binding the seeking thread in response to executing the call to the dynamic renderer, wherein binding the seeking thread prevents the media player from executing additional calls to the dynamic renderer;
receiving a second input during the presentation of the media segment, wherein the second input corresponds to a seek operation selecting a second location of the media segment, wherein the second input is received before the dynamic renderer returns a rendered frame corresponding to the first location of the media segment;

storing a representation of the second input into a single queue, wherein the single queue is a temporary storage location that stores one input at a time;

receiving the rendered frame corresponding to the first location of the media segment;

unbinding the seeking thread in response to receiving the frame corresponding to the first location of the media segment;

disposing the rendered frame corresponding to the first location of the media segment; and executing a call to the dynamic renderer requesting a frame corresponding to the second location of the media segment.

16. The non-transitory computer-readable medium of claim 15, wherein unbinding the seeking thread includes: passing a ready signal to a sub-process of the dynamic renderer synchronized to the seeking thread, wherein the sub-process of the dynamic renderer releases the seeking thread.

17. The non-transitory computer-readable medium of claim 15, wherein disposing the rendered frame of the media segment corresponding to the first location includes deleting the rendered frame.

18. The non-transitory computer-readable medium of claim 15, wherein disposing the rendered frame of the media segment corresponding to the first location includes storing the rendered frame in memory.

19. The non-transitory computer-readable medium of claim 15, further comprising:

receiving the rendered frame of the media segment corresponding to the second location of the media segment; and presenting the rendered frame of the media segment corresponding to the second location of the media segment.

20. The non-transitory computer-readable medium of claim 15, wherein the rendered frame corresponding to the first location of the media segment is a thumbnail.

* * * * *